United States Patent [19]

Chamberlain

[11] 4,242,989

[45] Jan. 6, 1981

[54] BOILER LEVEL CONTROL SYSTEM

[75] Inventor: Harvey H. Chamberlain, Marblehead, Mass.

[73] Assignee: General Electric Company, Lynn, Mass.

[21] Appl. No.: 38,658

[22] Filed: May 14, 1979

[51] Int. Cl.³ .............................................. F22D 5/26
[52] U.S. Cl. .............................................. 122/451 R
[58] Field of Search ...................... 122/451 R, 451 S; 165/40

[56] References Cited

U.S. PATENT DOCUMENTS

| | | | |
|---|---|---|---|
| 3,172,462 | 3/1965 | Brunner | 122/479 S |
| 3,250,259 | 5/1966 | Profos | 122/406 S |
| 3,417,737 | 12/1968 | Shinskey et al. | 122/451 R |
| 3,780,705 | 12/1973 | Le Febre de Vivy | 122/451 R |

*Primary Examiner*—Anthony V. Ciarlante
*Attorney, Agent, or Firm*—James W. Mitchell

[57] ABSTRACT

This disclosure relates to apparatus for steam generation or boilers and more specifically, discloses a system for controlling the fluid level in a boiler drum. Drum level control requires an observation of the fluid level in the drum and also takes into account steam flow out of the drum and feedwater flow into the drum. The present invention improves upon the prior art by providing an unusually responsive drum level controller in combination with inputs relating to steam flow and water flow. This is accomplished by considering the derivative of steam flow minus water flow in combination with a fast drum level controller.

10 Claims, 4 Drawing Figures

BOILER LEVEL CONTROL SYSTEM

BACKGROUND OF THE INVENTION

This invention relates, in general, to large free-standing steam generators of the type used in combined cycle power plants; and, in particular, this invention is a control system for controlling the input of feedwater into a boiler drum.

In a combined cycle power plant, a heat recovery steam generator (HRSG) is the connecting thermal link between a gas turbine and a steam turbine. The HRSG channels hot gas turbine exhaust gas passed finned heat exchanger tubes to hear steam/water contained in the tubes in a counterflow heat exchange relation. A boiler drum is associated with the heat exchanger tubes and normally produces steam for a superheater.

Boiler controls could be designed to maintain a fixed drum level set point. One type of control is a single-element feedwater control. Single-element control will maintain a constant drum level for slow changes in load, steam pressure, or feedwater pressure. However, since the control signal satisfies the requirements of drum level only, excessive "swell or shrink" effects will result in wider drum-level variations and a longer time for restoring drum level to set point following a load change. The foregoing single-element feedwater control can be improved by a two-element control comprising a feed forward control loop which utilizes steam flow measurement to control feedwater input, with level measurement assuring correct drum level. Once again, the drum level correction must be slow-acting because there are times, particularly during startup when there is no steam flow.

A three-element control system is a cascaded-feed forward control loop which maintains water-flow input equal to feedwater demand. This type of control system is fully explained in a latter portion of the present discourse and the present invention seeks to improve upon the function of the system. The improvement relates to a response time and reliability in a three-element control system.

BRIEF DESCRIPTION OF THE INVENTION

The present invention provides a feedwater controller wherein steam flow measurement and water flow measurement are not recognized if they are in an equilibrium condition. That is to say that through derivative action if the difference between steam flow and water flow remains constant then the derivative output goes to zero. This condition is prevalent at startup and hence, the controller provides an improved response in attaining drum level equal to drum level set point. If water flow changes relative to steam flow then that will be taken into account as hereinafter described. The invention further implements level control by means of a fast level controller as distinguished from slow prior art level controllers.

OBJECTS OF THE INVENTION

It is an object of the present invention to provide a boiler level control system where preference is given to fast drum level control under certain conditions.

It is another object of the invention to provide a three-element drum level controller which may provide fast correction of drum level error.

It is another object of the present invention to provide a drum level controller which is not affected by measurement inaccuracies regarding steam flow and water flow.

The novel features believed characteristic of the present invention are set forth in the appended claims. The invention itself, however, together with further objects and advantages thereof, may best be understood with reference to the following description taken in connection with the drawings.

DETAILED DESCRIPTION OF THE INVENTION

Figure 1:
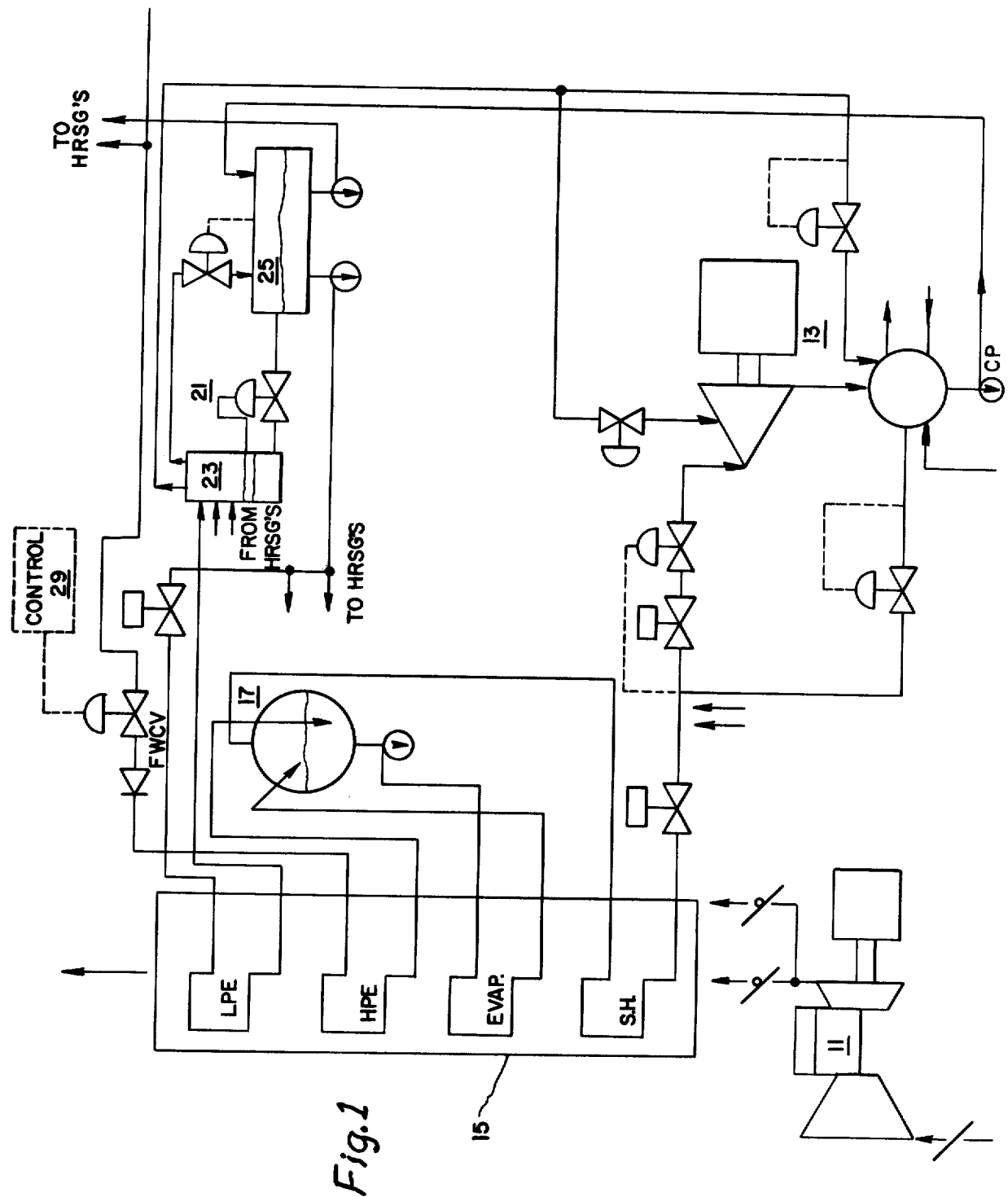
FIG. 1 is a line drawing of a typical combined cycle power plant showing the location of a boiler drum and a feedwater control valve.

FIG. 1 shows a combined cycle power plant which includes at least one gas turbine-generator 11, at least one steam turbine-generator 13 interconnected by a heat recovery steam generator 15. Hot exhaust gas from the gas turbine is input into the HRSG to produce steam for the steam turbine. The HRSG may be divided into sections such as a low pressure economizer (LPE), high pressure economizer (HPE), evaporator (EVAP), and a superheater (SH). Further, as part of the steam producing cycle, a boiler drum 17 is connected to the evaporator, high pressure economizer and superheater.

Feedwater to the boiler through the high pressure economizer section may be preheated in the low pressure economizer through a so-called DAASH cycle loop 21 which includes a flash tank 23 and a deaerator 25.

A description of cycle operation is currently available to those having ordinary skill in the art and need not be further explained in order to obtain an understanding of the invention. However, it is pointed out that the object of the invention is to control the water level in boiler drum 17 by means of the feedwater control valve (FWCV) in accordance with a signal output from a control station 29.

Figure 2:
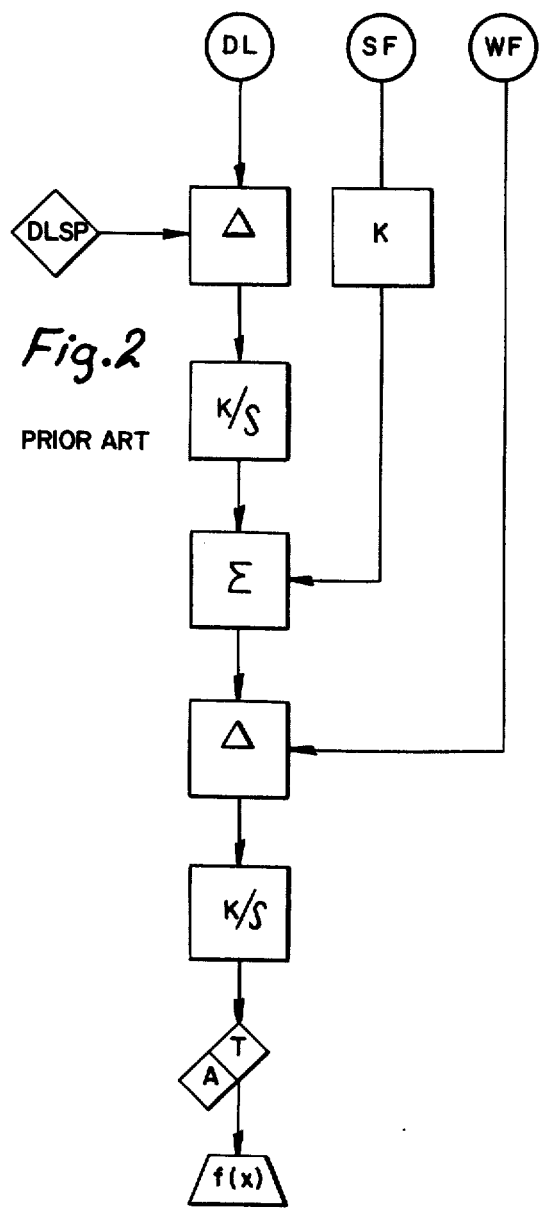
FIG. 2 is a logic diagram showing a three-element drum level control in accordance with the prior art.

FIG. 2 shows a prior art three-element control scheme. Three-element control is a cascaded-feed-forward control loop which maintains water-flow input equal to feedwater demand. Drum-level measurement keeps the level in the drum from drifting due to flowmeter errors, blowdown or other causes.

Actual drum level (DL) is sensed by a level transmitter (not shown) and subtracted from a drum level set point (DLSP) as determined by the plant operator. The drum level controller applies proportional K plus integral ∫ action to the error between the drum level and its set point. A steam-flow (SF) signal is sensed by a flow transmitter (not shown) and is input into a summing junction with the drum level error signal. The summation of the drum level error signal and the steam flow signal becomes the feedwater-demand signal. The feedwater demand signal is subtracted from the water flow (WF) input signal and the difference is the combined output of the controller. Proportional-plus-integral action is incorporated to provide a feedwater correction signal for valve regulation.

In the practical implementation of the FIG. 2 logic, the drum level controller immediately upstream from the summing junction is assigned a lengthy time constant to avoid system instabilities. The drum has a long time constant, and the controller must be slow compared to the process.

Figure 3:
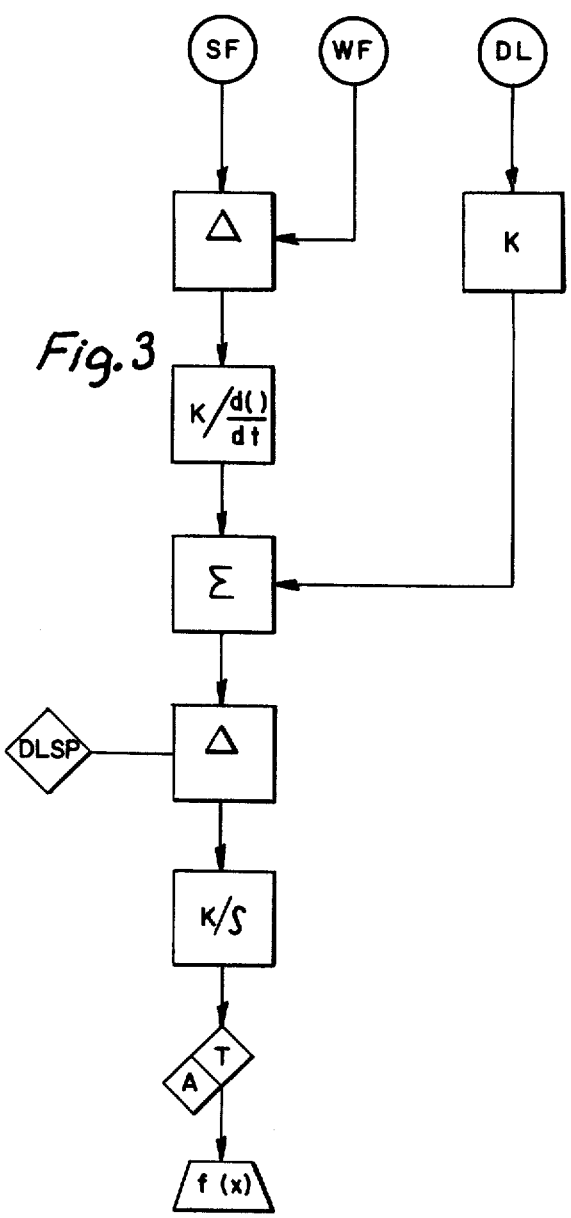
FIG. 3 is a logic diagram showing a three-element level control system according to the present invention.

In FIG. 3, a logic diagram is shown according to the present invention. Steam flow less water flow is input into a computational module which takes the derivative d/dt of the input signal. Thus, at startup there is no steam flow or initial water flow so the output of the computational module is zero. If there is a constant and steady state difference between steam flow and water flow the output of the computational module is zero. Thus it is only when there is a relative change between steam flow and water flow that there is an output.

Assuming that the computational module output is zero then it is apparent that the remaining part of the logic is simply a fast drum level controller where drum level is subtracted from drum level set point and then put through a proportional plus integral function.

As soon as water flow is detected, then it will act as a brake on the level controller through the derivative function making the controller ideal for startup functions. Steam flow, when available will also be taken into account by the controller. However, permanent error in water flow or steam flow measurement has no effect on the level controller after steady state operation is achieved. Thus the present invention seeks to satisfy a drum level set point using a fast controller slowed only by rate of change of steam flow minus water flow, whereas in the prior art, a level difference was used to define, in conjunction with steam flow, a feedwater demand in order to determine a feedwater error.

Figure 4:
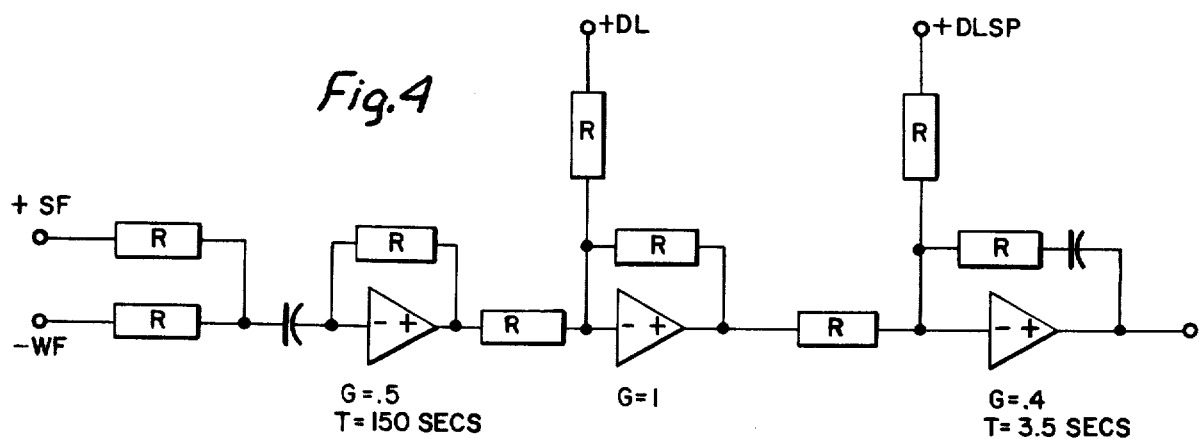
FIG. 4 is a representation of an electrical circuit suitable for carrying out the logic diagram shown in FIG. 3.

FIG. 4 shows an electronic implementation schematic of the present invention. Power supplies and ground connection have been omitted since this would become obvious from a description of the circuitry. Drum level (DL), steam flow (SF) and water flow (WF) inputs may be obtained through sensing devices well-known in the art. Drum level set point (DLSP) is input through a suitable signal generator such as a sliding scale potentiometer. The steam flow and water flow are subtracted and the remaining signal is input into a computation module as shown which will output a derivative signal based on the inputs. The computational module may be purchased from the Foxboro Company in Foxboro, Mass. under the identification of a Dynamic Compensator number 2AC+DYC-L. A time constant of 150 seconds is used and a gain of 0.5 found suitable in the preferred embodiment and under the conditions of use.

The drum level signal is input into a Foxboro Summer number 2AP+SUM with a gain of one. Finally, the output is conditioned in a proportional plus integral amplifier having a gain of 0.4 and a time constant equal to 3.5 seconds. This latter element is a Foxboro controller 2AC+A4.

The invention operates in the following manner: The controller is a drum level controller which has a fast time constant. Steam flow and water flow are considered through a derivative circuit and provide the advantage of control but eliminate steady state error. Finally, since the computation module is a derivative device it tends towards zero or a balance condition. In the three-element device of the prior art the drum level controller is an integrating device and hence has the disadvantage of reset wind-up which is obviated in the present device.

While there has been shown what is considered, at present, to be the preferred embodiment of the invention, it is, of course, understood that various modifications may be made therein with respect to the application and details of the invention. It is intended to cover all such modifications as fall within the true spirit and scope of the invention.

What is claimed is:

1. A boiler drum water level control system comprising:
   a feedwater control valve upstream from the boiler drum water inlet;
   a valve controller for controlling the position of the feedwater control valve; and,
   a control circuit for generating a valve control signal based on the difference between drum level and drum level set point modified by the rate of change of the difference between steam flow and water flow.

2. The system recited in claim 1 wherein the difference rate of change between steam flow and water flow is a derivative signal.

3. A boiler drum water level control system including a feedwater control valve upstream from the boiler drum water inlet; a valve controller for controlling the position of the feedwater control valve; and, a control circuit for generating a valve control signal comprising:
   means to provide a first signal input into the circuit proportional to steam flow;
   means to provide a second signal input into the circuit proportional to feedwater flow;
   means for taking the derivative of the difference between said first and second signals to generate a third signal based on the rate of change difference between steam flow and water flow; and,
   a level controller having drum level and drum level set point inputs and the third signal input.

4. The system recited in claim 3 further comprising:
   a relatively slow time constant set into said derivative means; and,
   a relatively fast time constant set into said level controller.

5. The system recited in claim 3 wherein the derivative means is an amplifier circuit having an input capacitor and a feedback resistor.

6. The system recited in claim 3 wherein the level controller includes an amplifier having a series resistor and capacitor feedback loop.

7. The system recited in claim 4 wherein the relatively slow time constant is 150 seconds and the relatively fast time constant is 3.5 seconds.

8. A boiler level control circuit comprising:
   means providing a first signal input proportional to steam flow;
   means providing a second signal input proportional to water flow;
   a differentiator amplifier receiving the difference between the first and second signal inputs;
   a summing amplifier connected to the output of the differentiator amplifier and receiving a signal input proportional to drum water level; and,
   an integrator/proportional amplifer connected to the output of the summing amplifier and receiving a signal input proportional to drum level set point, said integrator/proportional amplifer output being a valve control signal.

9. The circuit recited in claim 8 wherein the differentiator amplifier has a time constant of about 150 seconds.

10. The circuit recited in claim 9 wherein the integrator amplifier has a time constant of about 3.5 seconds.

* * * * *